(12) United States Patent
Ganzer et al.

(10) Patent No.: US 11,110,483 B2
(45) Date of Patent: Sep. 7, 2021

(54) LIQUID MATERIAL DISPENSING SYSTEM HAVING A SLEEVE HEATER

(71) Applicant: NORDSON CORPORATION, Westlake, OH (US)

(72) Inventors: Charles P. Ganzer, Cumming, GA (US); Robert J. Woodlief, Suwanee, GA (US); Sang H. Shin, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/760,142

(22) PCT Filed: Oct. 26, 2018

(86) PCT No.: PCT/US2018/057737
§ 371 (c)(1),
(2) Date: Apr. 29, 2020

(87) PCT Pub. No.: WO2019/089378
PCT Pub. Date: May 9, 2019

(65) Prior Publication Data
US 2020/0254476 A1    Aug. 13, 2020

Related U.S. Application Data

(60) Provisional application No. 62/579,492, filed on Oct. 31, 2017.

(51) Int. Cl.
*B05C 11/10*    (2006.01)
*B05C 5/00*    (2006.01)
(Continued)

(52) U.S. Cl.
CPC .......... *B05C 11/1042* (2013.01); *B05C 5/001* (2013.01); *B05C 5/0225* (2013.01);
(Continued)

(58) Field of Classification Search
CPC ... B05C 11/1042; B05C 5/001; B05C 5/0225; B05C 5/0279; B29B 13/022; B29K 2105/0097
(Continued)

(56) References Cited

U.S. PATENT DOCUMENTS 5,325,822 A    7/1994  Fernandez
5,747,102 A *  5/1998  Smith ............... B05C 5/001
                                              427/98.4
(Continued)

FOREIGN PATENT DOCUMENTS

CN        1692990 A      11/2005
CN      100540150 C       9/2009
(Continued)

*Primary Examiner* — Vishal Pancholi
(74) *Attorney, Agent, or Firm* — BakerHostetler

(57) ABSTRACT

A dispensing system receives liquid material and process air. The dispensing system includes a manifold body having a liquid material passage and a process air passage. The dispensing system includes a heating member received in the manifold body. The heating member has an upper portion, a lower portion, an outer surface, and a groove in the outer surface. The groove may extend between the upper portion and the lower portion and form at least a portion of the process air passage. The dispensing system may further include a nozzle configured to dispense the liquid material. The heating member may be configured to heat the process air as the process air passes through the groove and heat the liquid material through contact of the outer surface of the heating member with the manifold body.

20 Claims, 9 Drawing Sheets

(51) Int. Cl.
*B05C 5/02* (2006.01)
*B29B 13/02* (2006.01)
*B29K 105/00* (2006.01)

(52) U.S. Cl.
CPC ........... *B05C 5/0279* (2013.01); *B29B 13/022* (2013.01); *B29K 2105/0097* (2013.01)

(58) Field of Classification Search
USPC ..................................................... 222/146.5
See application file for complete search history.

(56) References Cited

U.S. PATENT DOCUMENTS

| | | | |
|---|---|---|---|
| 5,773,080 | A | 6/1998 | Simmons et al. |
| 6,089,413 | A | 7/2000 | Riney et al. |
| 6,260,583 | B1 | 7/2001 | Flatt et al. |
| 7,046,922 | B1 | 5/2006 | Sullivan et al. |
| 7,082,262 | B2 | 7/2006 | Clark et al. |
| RE39,399 | E * | 11/2006 | Allen .................... B05B 7/0861 425/7 |
| 7,264,717 | B2 | 9/2007 | Gould et al. |
| 7,822,326 | B2 | 10/2010 | Commette et al. |
| 7,823,752 | B2 * | 11/2010 | Riney .................... B05C 5/001 222/146.5 |
| 8,249,437 | B2 | 8/2012 | Commette et al. |
| 8,453,880 | B2 * | 6/2013 | Saidman ................ B05C 5/001 222/146.2 |
| 8,578,729 | B2 * | 11/2013 | Fiske .................... B05C 5/001 62/324.6 |
| 9,415,415 | B1 | 8/2016 | Jones |
| 2005/0236316 | A1 | 10/2005 | Gould et al. |
| 2005/0236430 | A1 | 10/2005 | Clark et al. |
| 2009/0065611 | A1 * | 3/2009 | Harris .................. B05C 5/0279 239/390 |
| 2012/0217268 | A1 | 8/2012 | Saidman |
| 2015/0258567 | A1 | 9/2015 | Harris et al. |
| 2016/0256889 | A1 | 9/2016 | Jones |

FOREIGN PATENT DOCUMENTS

| | | |
|---|---|---|
| CN | 102686321 A | 9/2012 |
| CN | 205481735 U | 8/2016 |
| EP | 1407830 A2 | 4/2004 |

* cited by examiner

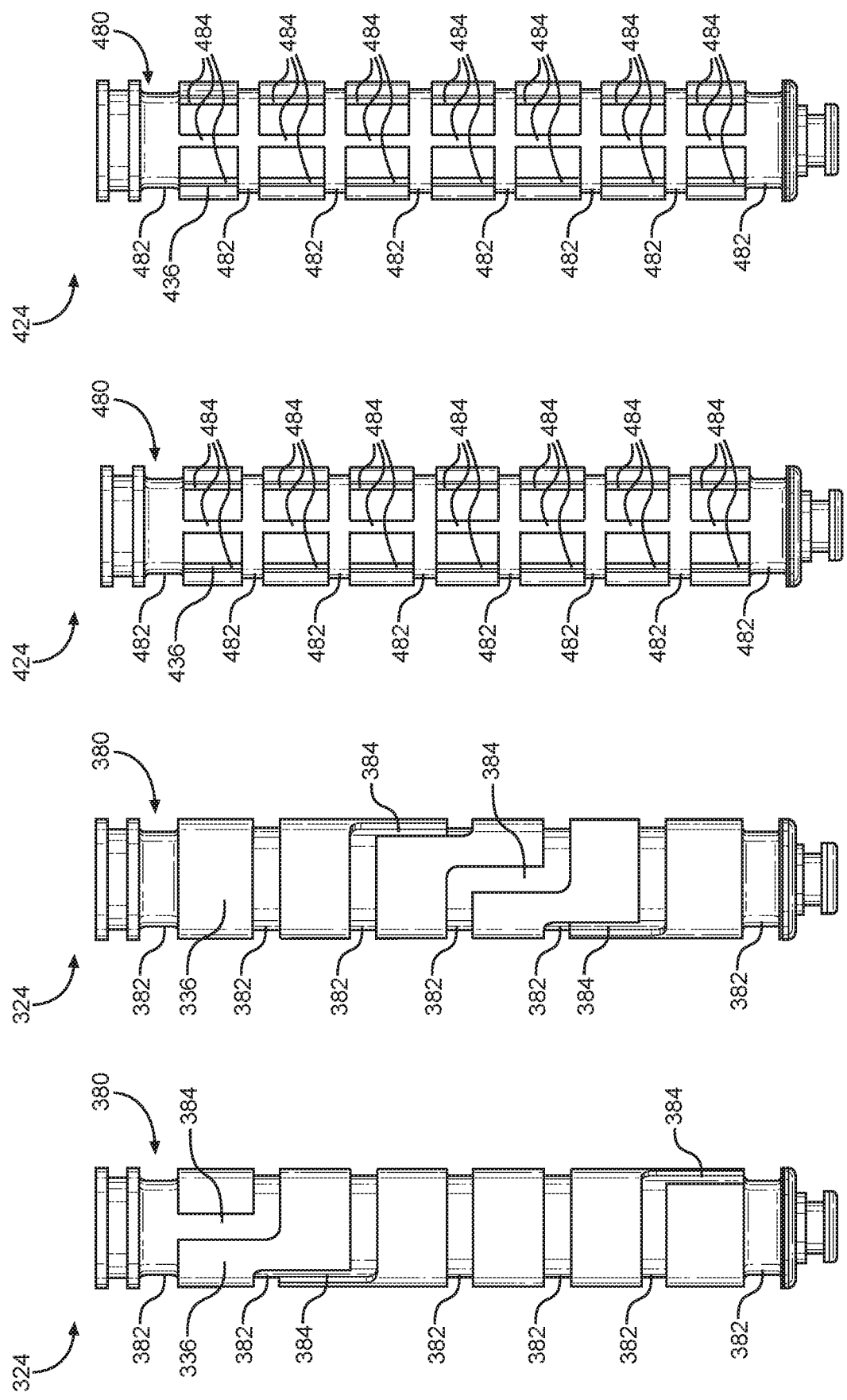

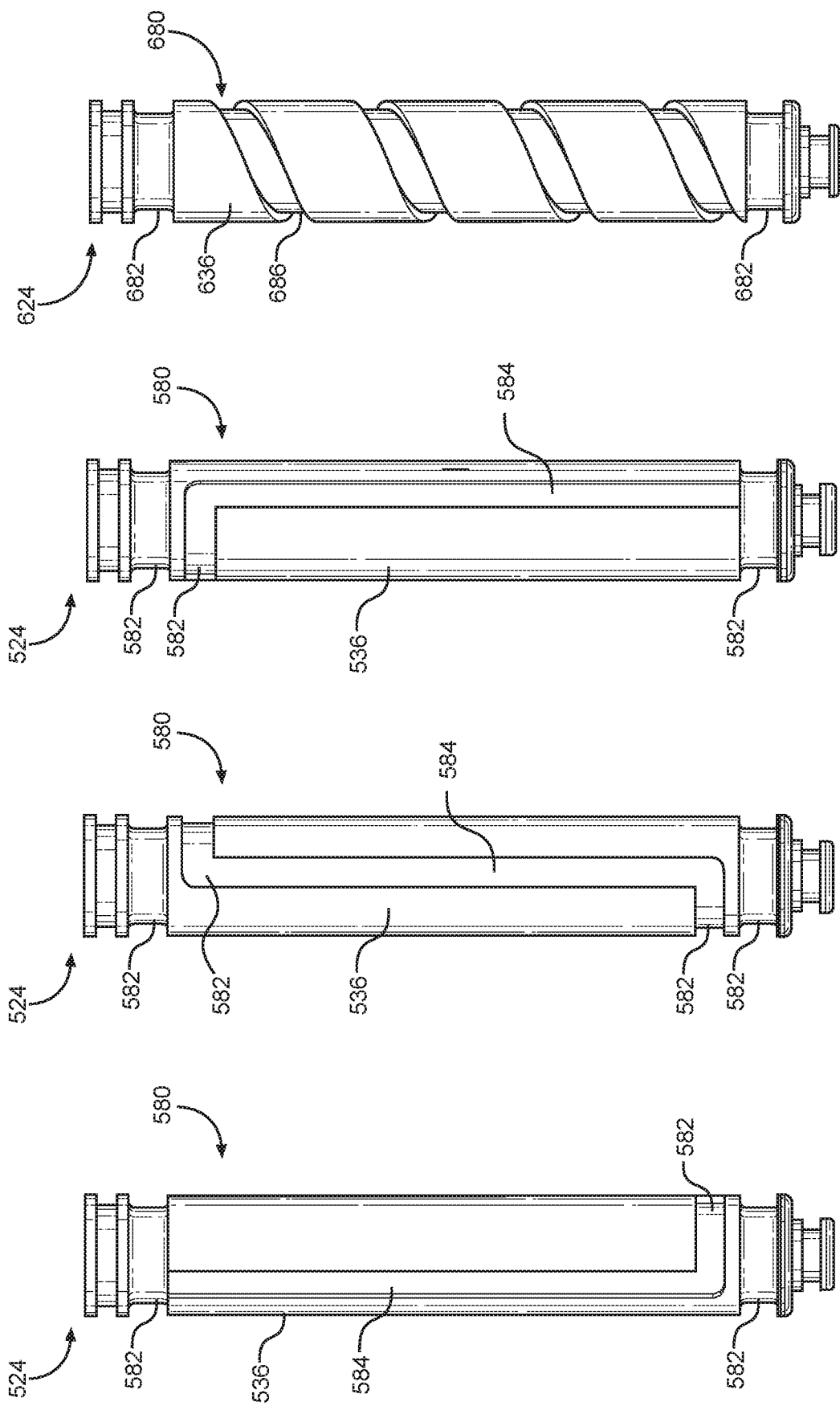

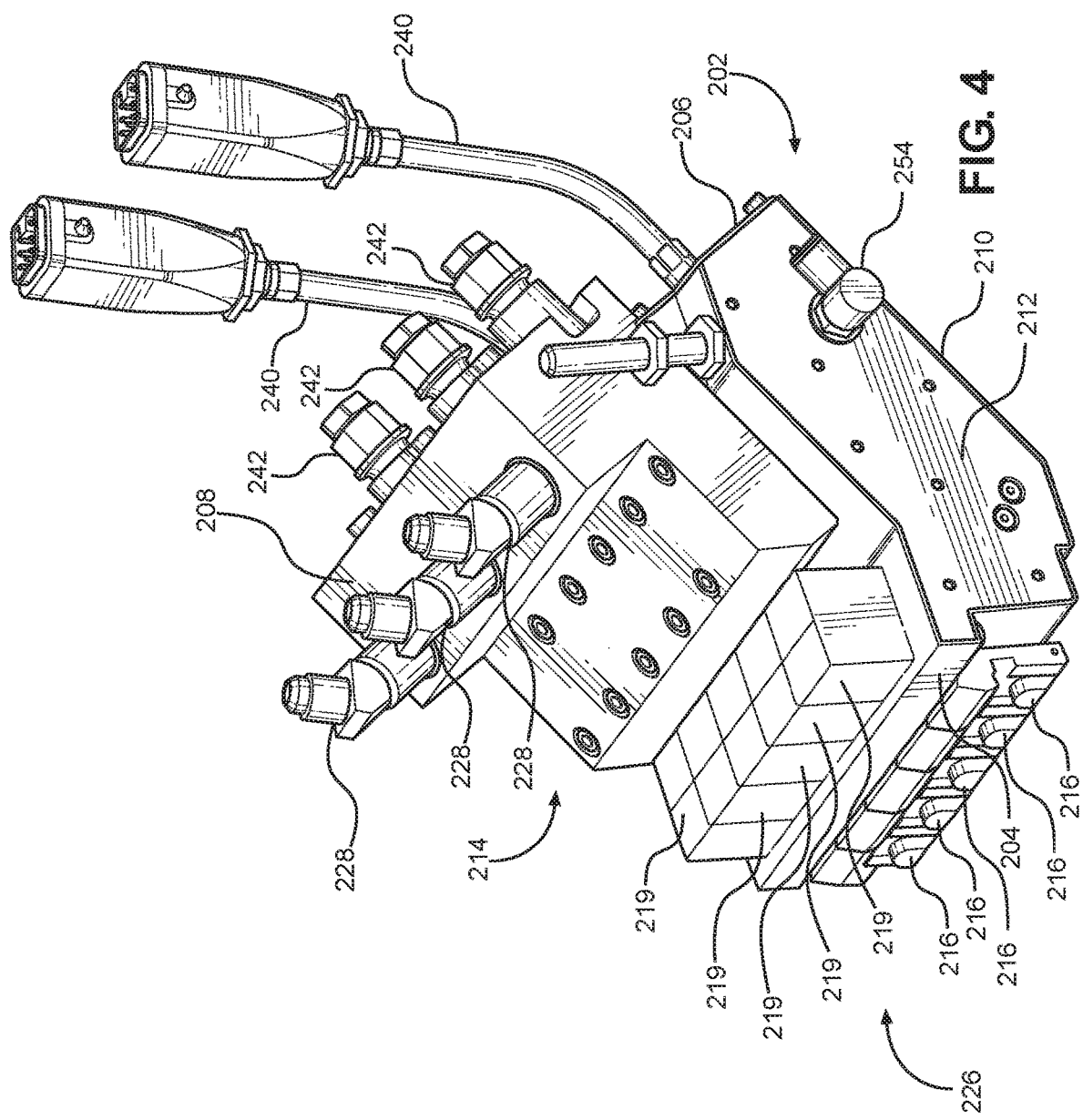

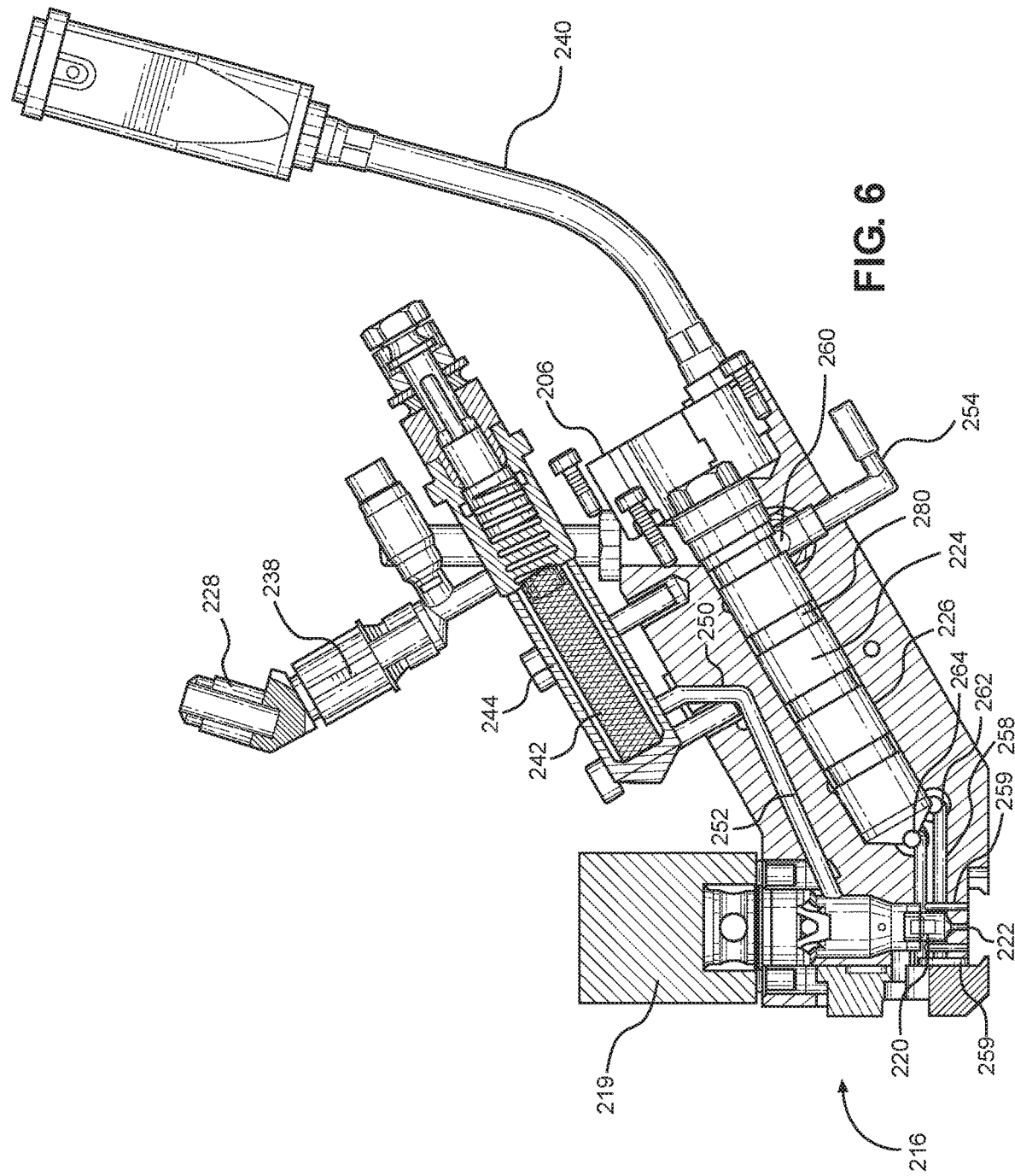

LIQUID MATERIAL DISPENSING SYSTEM HAVING A SLEEVE HEATER

CROSS REFERENCE TO RELATED APPLICATIONS

This application is a U.S. National Stage of PCT International Patent App. No. PCT/US2018/057737, filed Oct. 26, 2018 and now expired, which claims the benefit of U.S. Provisional Patent App. No. 62/579,492, filed Oct. 31, 2017 and now expired, the entire disclosures of both of which are hereby incorporated by reference as if set forth in their entireties herein.

TECHNICAL FIELD

The present disclosure relates generally to dispensing liquid, and more particularly, to systems and methods for dispensing liquid heated with a sleeve heater.

BACKGROUND

Dispensing systems often apply thermoplastic materials (e.g., hot melt adhesives) to various substrates (e.g., diapers, sanitary napkins, surgical drapes). Many thermoplastic materials exist in a solid form at room temperature and require heat to create a flowable viscous liquid. Therefore, dispensing systems generate heat to melt the thermoplastic materials, which are distributed to one or more dispensing valves for application to the substrate. Pressurized process air is often directed toward the liquid as it is dispensed to attenuate or draw down the dispensed liquid material and to control the pattern of the liquid material as it is applied to the substrate.

The process air must be heated to ensure that the process air does not cause the thermoplastic material to cool and solidify prior to application. However, current hot melt applicators heat the process air and adhesive with separate manifolds, heaters, and controls, which results in increased applicator envelope, system complexity, manufacturing costs, and service parts. The increased physical envelope creates different heating zones within the system that are sometimes exceed the capacity of those available from the melter, thereby further increasing cost.

A need therefore exists for an improved liquid material dispensing system which addresses various drawbacks of prior dispensing systems, such as those described above.

SUMMARY

The foregoing needs are met, to a great extent, by the systems and methods described herein. One aspect is directed to a dispensing system configured to receive liquid material and process air. The dispensing system includes a manifold body having a liquid material passage and a process air passage. The dispensing system also includes a heating member received in the manifold body. The heating member has a first (e.g., upper) portion, a second (e.g., lower) portion, an outer surface, and a groove in the outer surface. The groove may extend between the upper portion and the lower portion and form at least a portion of the process air passage. The dispensing system may further include a nozzle configured to dispense the liquid material. The heating member may be configured to heat the process air as the process air passes through the groove and heat the liquid material through contact of the outer surface of the heating member with the manifold body.

Another aspect is directed to a method of dispensing a liquid material. The method may include receiving the liquid material in a liquid passage of a manifold body, and receiving process air in a process air passage of the manifold body. The method may also include heating the liquid material through contact of an outer surface of a heating member with the manifold body, and heating the process air by receiving the process air in a groove of the heating member. The groove may extend from an upper portion of the heating member to a lower portion of the heating member and form at least a portion of the process air passage. The method may further include dispensing the liquid material with a nozzle.

Yet another aspect is directed to a dispensing system configured to receive liquid material and process air. The dispensing system includes a manifold body, a filter assembly, a heating member, a temperature sensor, and a nozzle. The manifold body includes a liquid material passage and a process air passage. The filter may be disposed in the liquid material passage and configured to remove contaminants from the liquid material. The heating member is received in the manifold body and has a heating cartridge and a heating sleeve disposed around the heating cartridge. The heating member has an upper portion, a lower portion, an outer surface, and a groove in the outer surface. The groove may extend between the upper portion and the lower portion and form at least a portion of the process air passage. The groove may include a plurality of annular segments and a plurality of longitudinal segments that alternate along a longitudinal length of the heating member. The temperature sensor may be disposed in the manifold body and be configured to detect heat generated by the heating member. The nozzle may be configured to dispense the liquid material. The heating member may be configured to heat the process air as the process air passes through the groove and heat the liquid material through contact of the outer surface of the heating member with the manifold body.

BRIEF DESCRIPTION OF THE DRAWINGS

In order that the disclosure may be readily understood, aspects of this disclosure are illustrated by way of examples in the accompanying drawings.

FIG. 3D illustrates an exemplary front view of a second exemplary heating member of the exemplary dispensing system of FIGS. 1 and 2.

FIG. 3E illustrates an exemplary rear view of the second exemplary heating member of FIG. 3D.

FIG. 3F illustrates an exemplary front view of a third exemplary heating member of the exemplary dispensing system of FIGS. 1 and 2.

FIG. 3G illustrates an exemplary rear view of the third exemplary heating member of FIG. 3F.

FIG. 3H illustrates an exemplary front view of a fourth exemplary heating member of the exemplary dispensing system of FIGS. 1 and 2.

FIG. 3I illustrates an exemplary side view of the fourth exemplary heating member of FIG. 3H.

FIG. 3J illustrates an exemplary rear view of the fourth exemplary heating member of FIGS. 3H and 3I.

FIG. 3K illustrates an exemplary exterior view of a fifth exemplary heating member of the exemplary dispensing system of FIGS. 1 and 2.

FIG. 4 illustrates an exemplary isometric view of a second exemplary dispensing system having a plurality of dispensing valves.

FIG. 6 illustrates an exemplary longitudinal cross-sectional view of the exemplary dispensing system of FIGS. 4 and 5.

The same reference numbers refer to the same parts in the drawings and the detailed description.

DETAILED DESCRIPTION

Systems and methods for dispensing a fluid material are described herein. The system may include a manifold body having internal passages the receive liquid material (e.g., a viscous thermoplastic material) and process air. The system may also include and one or more heating members having a cartridge and a heating sleeve. The heating sleeve may have an outer surface with a groove that forms at least a portion of the process air passage. The groove may extend from a first (e.g. upper) portion to a second (e.g., lower) portion of the heating sleeve. The outer surface of the heating sleeve may also contact the manifold body to enclose the process air passage and to heat the liquid material. The groove may have a depth less than about 0.10" and provide a non-linear and/or tortuous path that increases contact between the heating sleeve and the process air. In some embodiments, the groove may provide a stepped path, having a plurality of longitudinal segments and annular segments, alternating along the longitudinal length of the heating member. In some embodiments, the groove may include a helical segment. The heater sleeve may divide the process air into separate flow paths along a least a portion of a longitudinal and/or circumferential length of the heat sleeve. For example, the heater sleeve may divide the process air with annular segments, parallel longitudinal segments, and/or parallel or intersecting helical segments of the groove, as further discussed below.

The geometry of the grooves of the heating sleeve may be configured to provide balanced thermal loading to the process air and liquid material. The surface area of the outer surface may be greater than a surface area of the groove to increase heat transfer to the manifold body to heat the liquid material. The heating member may be configured to simultaneously heat the process air and the liquid material, eliminating the need for separate heating members for each of the process air and the liquid material. In that sense, the disclosed dispensing system may reduce manufacturing costs and the need to stock multiple parts. The disclosed dispensing system may also allow for a more compact manifold body.

Figure 1:
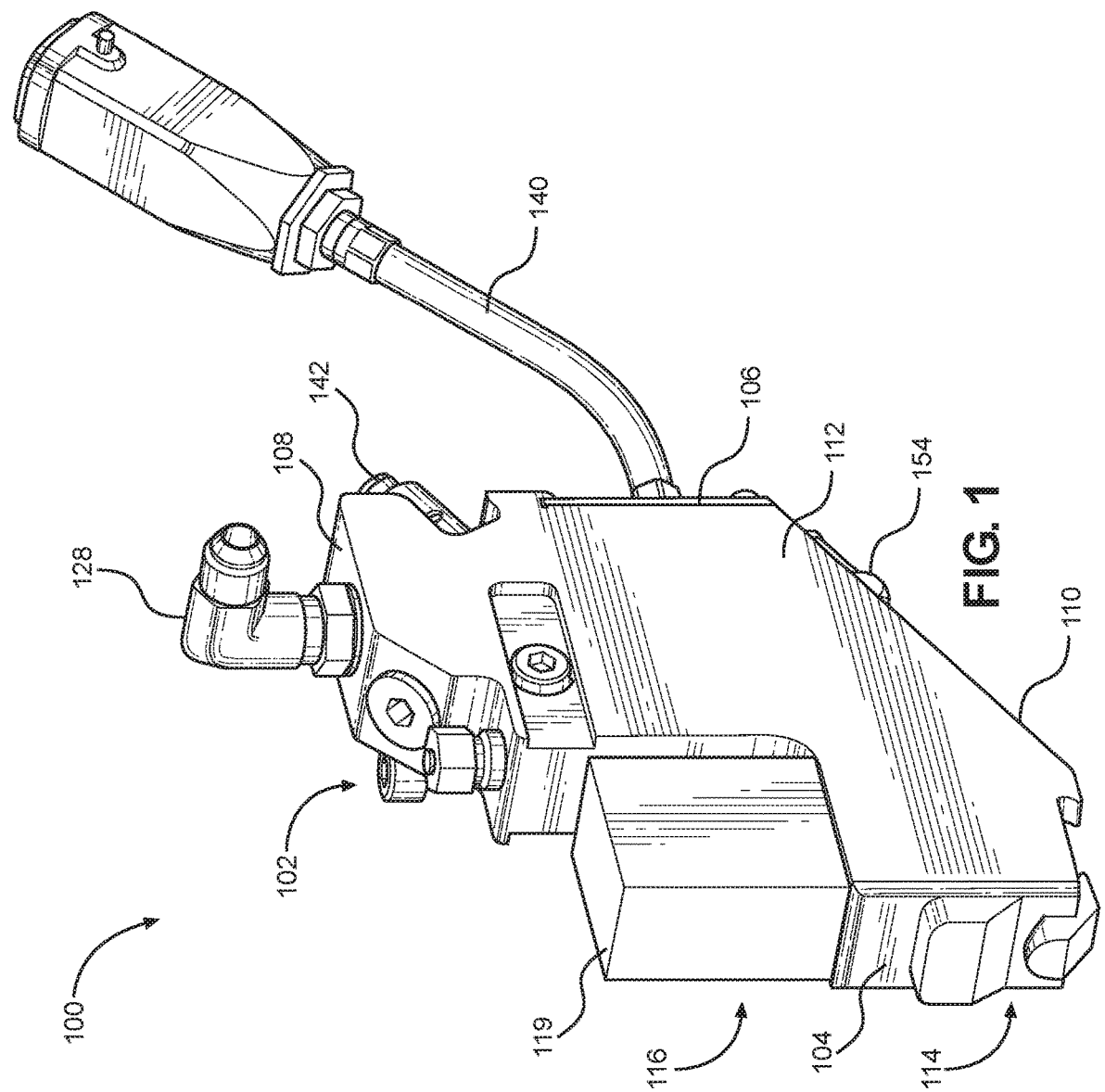
FIG. 1 illustrates an exemplary isometric view of a first exemplary dispensing system.
Figure 2:
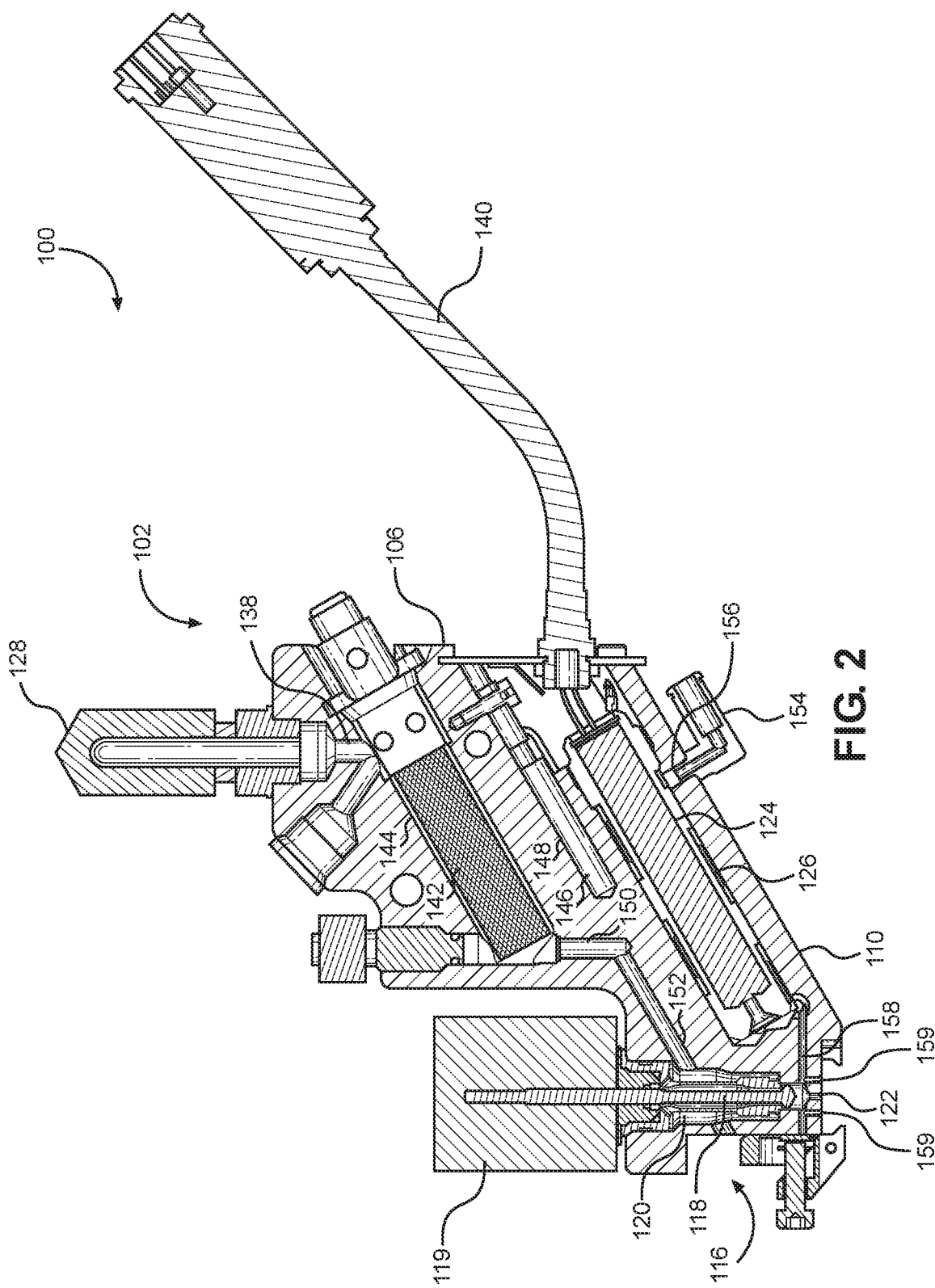
FIG. 2 illustrates an exemplary longitudinal cross-sectional view of the exemplary dispensing system of FIG. 1.

FIGS. 1 and 2 illustrate an exemplary dispensing system 100 including a manifold body 102. The manifold body 102 may have a front surface 104, a rear surface 106, an upper surface 108, a lower surface 110, and oppositely disposed longitudinal surfaces 112, 114.

The dispensing system 100 may include a dispensing valve 116 integrated and/or secured to the front of the manifold body 102. The dispensing valve 116 may include an on/off type nozzle having a valve stem 118 mounting for reciprocating movement in a chamber 120 (FIG. 2) along an axis to selectively dispense the liquid material (e.g., hot melt adhesive) in a specific pattern through a nozzle 122, such as in the form of one or more beads or filaments. The valve stem 118 may be reciprocally driven by a drive mechanism 119 that may apply pressurized air to an upper portion of the valve stem 118. The drive mechanism 119 may force the valve stem 118 into abutment with a valve seat at the bottom of chamber 120 to force the liquid material out of the nozzle 122 and onto the substrate. As further shown in FIGS. 1-2, the nozzle 122 may be integrated into the manifold body 102, and the drive mechanism 119 may be a separate component.

The dispensing system 100 may include a heating member 124 received in a heating member housing 126 of the manifold body 102 (FIG. 2), and the heating member 124 may be configured to transmit heat to the liquid material and the process air, simultaneously. The heating member 124 may have a heating cartridge 134 and a heating sleeve 136 (e.g., as depicted in FIGS. 3A-3D) and may be connected to an electrical cable 140 having one or more electric conduits. The electrical cable 140 may provide current from a power source (not shown) to the heating cartridge 134, and the heating cartridge 134 may generate and transfer heat to the heating sleeve 136. The heating sleeve 136 may transfer the heat to process air as the process air flows past the heating sleeve 136. The heating sleeve 136 may also transfer heat to the liquid material through contact with the manifold body 102. The heating sleeve 136 may transmit heat to the manifold body 102 through contact along the length of the heating sleeve 136, for example, at a first (e.g., upper) portion and a second (e.g., lower) portion of the heating sleeve 136. The manifold body 102 may be made of a heat-conductive material (e.g., aluminum) that transfers the heat from the heating sleeve 136 to the liquid material as it passes through the liquid material passages. A close fit between the heating cartridge 134, the heating sleeve 136, and the heating member housing 126 may provide an expanded footprint of the heating cartridge 134 and an improved uniformity and response of heating surfaces exposed to the process air and liquid material. For example, the heating cartridge 134 and heating sleeve 136 may be inserted into the manifold body 102 unheated and having a reduced diameter, and the close fit may be created by expanding the heating member 124 through heat generated by the heating cartridge 134. The heating member 124 may also include a hexagonal head on a top surface for engaging a tool (not shown) to facilitate insertion and/or removal of the unheated heating member 124 into/from the manifold body 102. As depicted in FIGS. 1-2, the manifold body 102 may house only a single heating member 124 (e.g., a single heating cartridge 134 and a single heating sleeve 136) that heats the process air and the liquid material, reducing the size of the manifold body 102.

The dispensing system 100 may also include a filter assembly 142 configured to filter out contaminants from the liquid material. As depicted in FIG. 2, the filter assembly 142 may be received in a filter assembly housing 144 extending through the rear surface 106 of the manifold body 102 and at an angle substantially parallel to the heating member housing 126. The filter assembly 142 may have an inlet, an outlet, and a passageway extending therebetween. The inlet of the filter assembly may be aligned with the vertical passage 138 to receive liquid material introduced into the manifold body 102 through a liquid material fitting 128. The filter assembly 142 may include a unitary filter body having a fine mesh screen to filter or remove particles from the dispensing liquid flowing through the passageway of the filter. The filter assembly 142 may also include a hexagonal head on a top surface for engaging a tool (not shown) to facilitate insertion and/or removal of the heating member 124 into/from the manifold body 102. The filter assembly 142 may be spring-biased permitting ready removal, as further described in U.S. Pat. No. 7,264,717 entitled "Liquid Dispensing Apparatus and a Filter Assembly for a Liquid Dispensing Apparatus" and incorporated herein by reference in its entirety.

The dispensing system 100 may further include a temperature sensor 146 received in a temperature sensor housing 148 of the manifold body 102. The temperature sensor 146 may be configured to detect heat generated by the heating member 124 and/or transmitted to the process air and/or liquid material. The temperature sensor 146 and the temperature sensor housing 148 may extend through the rear surface 106 and between the liquid material passage and the process air passage. In some embodiments, the temperature sensor 146 and the temperature sensor housing 148 may extend at an angle relative to the lateral axis of the manifold body 102 and substantially parallel to the heating member 124 and at least a portion of the liquid material passage. The temperature sensor 146 may be electrically connected to the electrical cable 140. The manifold body 102 may house one or more of the temperature sensors 146. However, in some embodiments, the manifold body 102 may house only a single temperature sensor 146 positioned between the heating member 124 and the liquid material passage, reducing the size of the manifold body 102.

The liquid material and pressurized process air may be supplied through the manifold body 102 to the dispensing valve 116 to thereby dispense beads or filaments of the liquid material onto a substrate. For example, the manifold body 102 may receive pressurized liquid material through the liquid material fitting 128 from a liquid material reservoir (not shown) via a liquid material pump (not shown). The liquid material fitting 128 may be recessed into the vertical passage 138 through the upper surface 108 of the manifold body 102, and the liquid material fitting 128 may be oriented in a number of different directions. The dispensing liquid may pass through the liquid material fitting 128 and the vertical passage 138, and into the filter assembly 142. The filter assembly 142 and the filter assembly housing 144 may be disposed at an acute angle relative to a lateral axis of the manifold body 102 and substantially parallel to the heating member 124 to provide a uniform heat distribution to the liquid material in the filter assembly 142. The filter assembly 142 may remove contaminants from the liquid material as the liquid material passes through the filter assembly housing 144. The liquid material may then pass through one or more passages 150, 152, where the liquid material is continuously heated. For example, the passages 150, 152 may sequentially include a vertical passage 150 and an angled passage 152 extending substantially parallel to the heating member 124, which increases the uniformity of the heat distribution of the liquid material. The liquid material may then enter into the chamber 120 of the dispensing valve 116 where the liquid material is dispensed through the nozzle 122.

The manifold body 102 may also receive pressurized pressure air through a process air fitting 154 recessed in a passage 156 on the lower surface 110 of the manifold body 102. The process air may then enter into a non-linear and/or tortuous passage disposed around the heating member 124, where the process air is heated. The process air may then pass through process air passage 158. The process air passage 158 may include an annular passage extending around the nozzle 122 to distribute the process air continuously or at discrete points around the liquid material dispensed through the nozzle 122. For example, the annular passage may include a plurality of air discharge orifices 159 around the nozzle 122 that provide air pressure to modify the shape and/or direction of the dispensed liquid material.

Figure 3A:
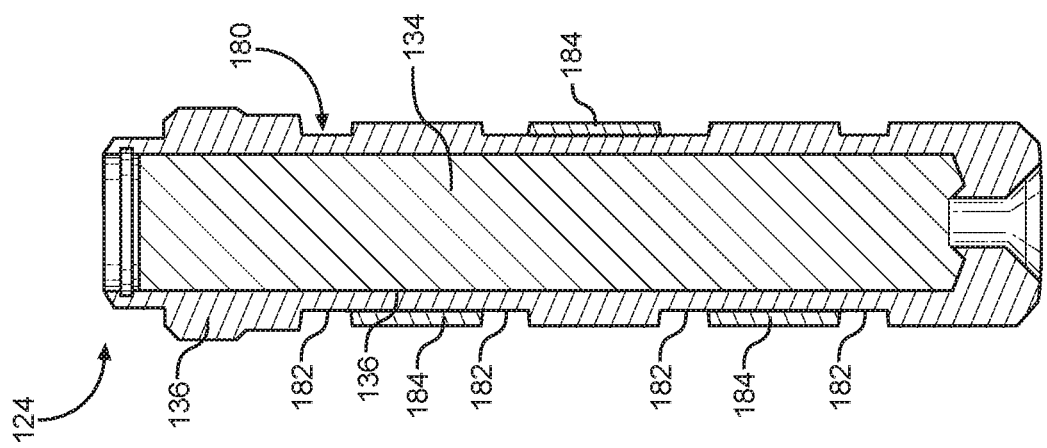
FIG. 3A illustrates an exemplary front view of a first exemplary heating member of the dispensing system of FIGS. 1 and 2.
Figure 3B:
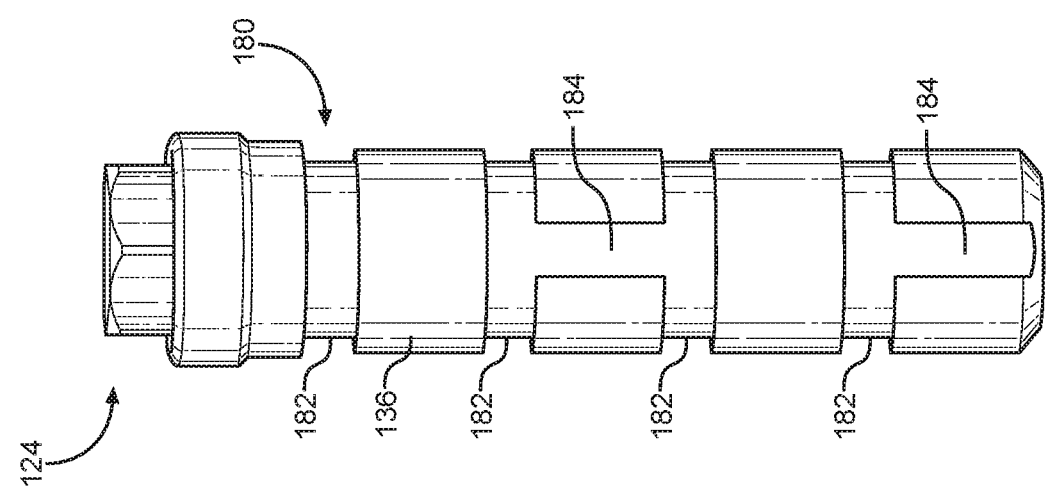
FIG. 3B illustrates an exemplary rear view of the first exemplary heating member of FIG. 3B.
Figure 3C:
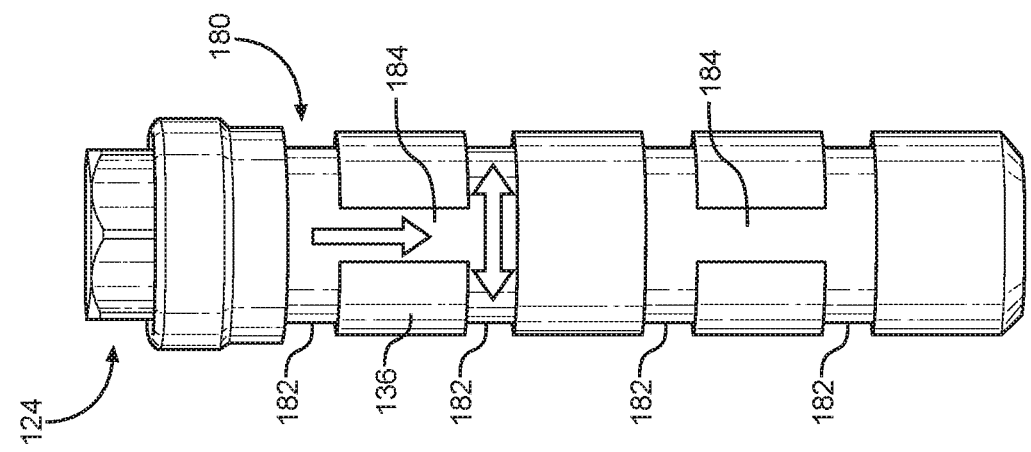
FIG. 3C illustrates an exemplary cross-sectional view of the first exemplary heating member of FIGS. 3A and B.

As further illustrated in FIGS. 3A-C, the heating member 124 may be a cartridge-style heating member having the heating sleeve 136 disposed around the heating cartridge 134. The heating sleeve 136 may include a groove 180 on an outer surface and extending from an first (e.g., upper) portion to a second (e.g., lower) portion. The groove 180 may define a passage constrained by the outer surface of the heating sleeve 136 and an interior surface of the heating member housing 126 of the manifold body 102. In some embodiments, the groove 180 may have a depth of less than about 0.10 inch to increase heat transfer. The heating sleeve 136 may also contact the manifold body 102 between the outer surface of the heating sleeve 136 and along the interior surface of the heating member housing 126. The heating sleeve 136 may contact the manifold body 102 along its longitudinal length, for example, at the upper portion and the lower portion of the heating sleeve 136. The heating sleeve 136 may transfer heat to the liquid material through the contact with the manifold body 102 as the liquid material passes through the liquid material passage. The outer surface of the heating sleeve 136 may have a surface area greater than the groove (e.g., a circumferential inner surface defining a lower surface of the groove 180 that does not contact the manifold body 102). The heating member 124 may be disposed at an acute angle relative to a lateral direction of the manifold body 102. The heating member 124 may also extend substantially parallel to at least a portion of the liquid material passage through the manifold body 102 to distribute heat uniformly. In some embodiments, the heating member 124 may extend substantially parallel to greater than half of the length of the liquid material passage through the manifold body 102. The heating member 124 may be sized to freely slide into and out of the heating member housing 126, but when heated, the heating member 124 may expand to contact the inner wall of the heating member housing 126 and improve the heat transfer.

The groove 180 may have a number of different non-linear and/or tortuous configurations to enhance heat transfer to the process air. In some embodiments, as depicted in a first exemplary embodiment of FIGS. 3A-3C, the groove 180 may have a stepped configuration with a plurality of annular segments 182 and a plurality of longitudinal segments 184. For example, the plurality of annular segments 182 and the plurality of longitudinal segments 184 may alternate along the longitudinal length of the heating member 124 to provide the non-linear and/or tortuous process air passage. As shown in the front view of FIG. 3A and the rear view of FIG. 3B, the annular segments 182 may extend the entire circumference of the heating sleeve 136, and the longitudinal segments 184 may alternate circumferential sides (e.g., at 180° along the circumference) of the heating sleeve 136 to provide a longer flow path along the longitudinal length and to increase the contact between heating sleeve 136 and the process air. The annular segments 182 may also divide the process air into first and second flow paths around the circumference of the heating sleeve 136 (e.g., as depicted in FIG. 3A) increasing the efficiency of heat transfer. The annular segments 182 may also favorably generate turbulence in the process air by dividing the process air into first and second flow paths.

As further shown in FIG. 2, the upper most annular segment 182 may be aligned with the process air fitting 154 to receive the process air. Furthermore, the uppermost longitudinal segment 184 may be on the side opposite of the process air fitting 154 to increase the flow path. The lowermost longitudinal segment 184 may have an open end aligned with the process air passage 156 to facilitate feeding the process air into the process air passage 158. However, in some embodiments, the groove 180 may be modified with a lower annular segment 182 (as generally illustrated in FIGS. 3D-O) that may be in communication with a lower gallery (e.g., 262, 264) of a manifold body (e.g., 202). When the process air reaches the lower end of the heating sleeve 136, the process air may be elevated to a temperature at or near the set point of the liquid material to reduce any thermal effect of the process air on the liquid material. As further depicted in FIG. 3C, the heating sleeve 136 may include a lumen configured to receive the heating cartridge 134 which emits heat. An upper surface of the heating cartridge 134 may be electrically connected to the electrical cable 140.

In a second exemplary embodiment as shown in a front view of FIG. 3D and a rear view of FIG. 3E, a heating member 324 may include a heating sleeve 336 with a groove 380 having one or more annular segments 382 that do not extend the entire circumference of the heating sleeve 336. For example, the annular segments 382 may extend greater than 180° around the circumference of the heating sleeve 336 and have closed ends. The annular segments 382 may also be connected at the closed ends by longitudinal segments 384 that are circumferentially offset along the longitudinal length of the heating sleeve 336. An upper annular segment 382 may extend the entire circumference of the heating sleeve 336 and may be in communication with an upper gallery (e.g., 260) of a manifold body (e.g., 202). A lower annular segment 382 may extend the entire circumference of the heating sleeve 336 and may be in communication with a lower gallery of the manifold. The annular segments 382 and the longitudinal segments 384 may create a tortuous and/or non-linear flow path to enhance heat transfer to the process air.

In a third exemplary embodiment as shown in a front view of FIG. 3F and a rear view of FIG. 3G, a heating member 424 may include a heating sleeve 436 with one or more grooves 480 having a plurality of parallel longitudinal segments 484 connecting annular segments 482. The parallel longitudinal segments 484 may divide the process air into a plurality of parallel flow paths increasing heat transfer from the heating sleeve 436 to the process air. The parallel longitudinal segments 484 may increase the surface area of the heating sleeve 436 contacting the process air. The parallel longitudinal segments 484 may also create a tortuous and/or non-linear flow path, for example, when process air passes through a first longitudinal segment 484, circumferentially through an annular segment 482, and into a circumferentially offset second longitudinal segment 484. The annular segments 482 may extend the entire circumference of the heating sleeve 436, and include an upper annular segment 482 that may be in communication with an upper gallery (e.g., 260) of a manifold body (e.g., 202) and a lower annular segment 382 that may be in communication with a lower gallery of the manifold.

In a fourth exemplary embodiment as shown in a front view of FIG. 3H, a side view of FIG. 3I, and a rear view of FIG. 3J, a heating member 524 may include a heating sleeve 536 with a groove 580 having one or more annular segments 582 and one or more longitudinal segments 584, alternating along a circumference of the heating sleeve 536. For example, the heating sleeve 536 may include an upper annular segment 582 configured to receive process air from an upper gallery (e.g., 260) of a manifold body (e.g., 202). The process air may pass from the upper annular segment 582 into a first longitudinal segment 584, down the heating sleeve 536, and into a first closed annular segment 582, as depicted FIG. 3H. The process air may then pass from the first closed annular segment 582 into a second longitudinal segment 584, up the heating sleeve 536, and into a second closed annular segment 582, as illustrated in FIG. 3I. The process air may then pass from the second closed annular segment 582, into a third longitudinal segment 584, down the heating sleeve 536, and into a lower annular segment 582. The process air may then pass from the lower annular segment 582, for example, into a lower gallery (e.g., 262, 264) of the manifold body.

In some embodiments, as depicted in a fifth exemplary embodiment of FIG. 3K, a heating member 624 may include a heating sleeve 636 with a groove 680 having one or more helical segments 686. The heating sleeve 636 may include an upper annular segment 682 configured to receive process air from an upper gallery (e.g., 260) of a manifold body (e.g., 202). The process air may then pass through the helical segment 686, into a lower annular segment 682, and then, for example, into a lower gallery (e.g., 262, 264) of the manifold body.

Figure 3O:
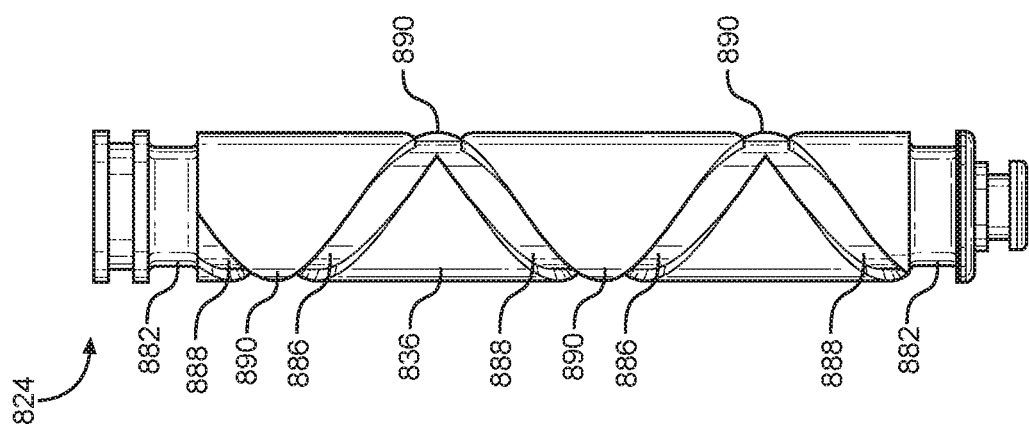
FIG. 3O illustrates an exemplary rear view of the seventh exemplary heating member of FIG. 3N.
Figure 3N:
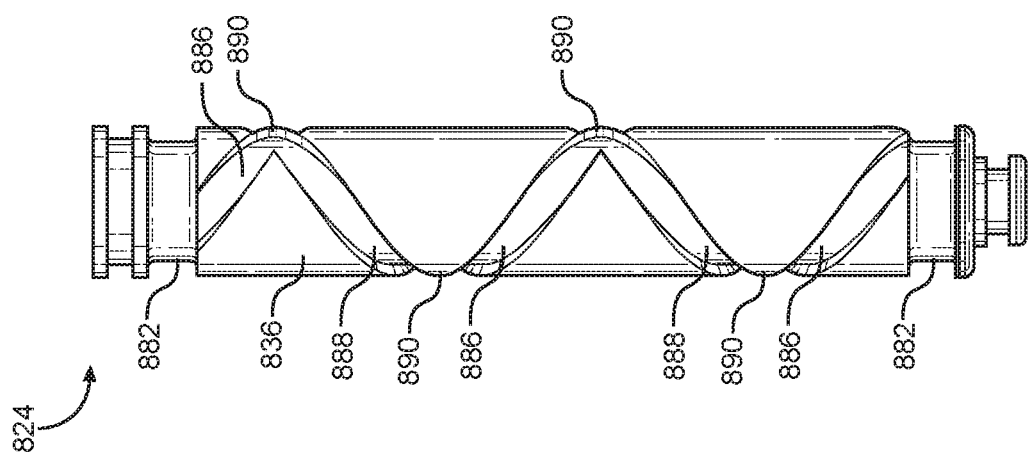
FIG. 3N illustrates an exemplary front view of a seventh exemplary heating member of the exemplary dispensing system of FIGS. 1 and 2.
Figure 3M:
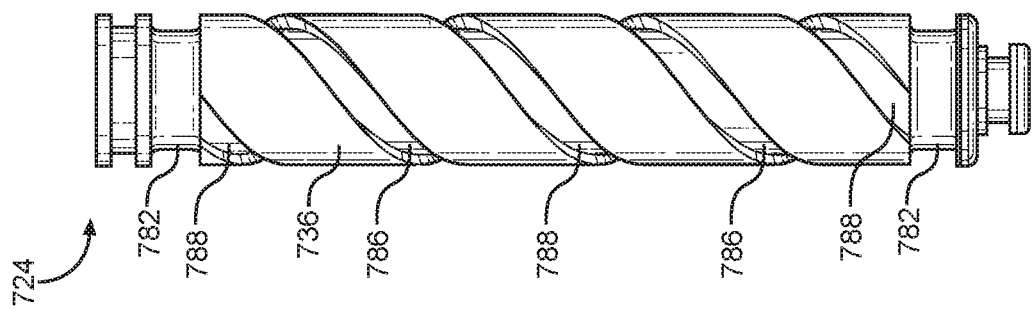
FIG. 3M illustrates an exemplary rear view of the sixth exemplary heating member of FIG. 3L.
Figure 3L:
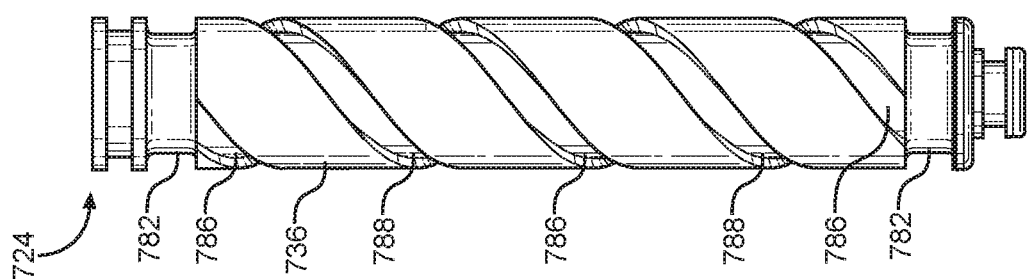
FIG. 3L illustrates an exemplary front view of a sixth exemplary heating member of the exemplary dispensing system of FIGS. 1 and 2.

In a sixth exemplary embodiment as shown in a front view of FIG. 3L and a rear view of FIG. 3M, a heating member 724 may include a heating sleeve 736 with one or more grooves 780 with a plurality of helical segments 786, 788 extending in the same direction around the heating sleeve 736. For example, the heating sleeve 736 may include an upper annular segment 782 configured to receive process air from an upper gallery (e.g., 260) of a manifold body (e.g., 202). The process air may then be divided into a first flow path through the first helical segment 786 and a second flow path through the second helical segment 788. The process air from each of the first and second flow paths may pass into a lower annular segment 782 and, for example, in a lower gallery (e.g., 262, 264) of the manifold body. Although the heating member 724 is illustrated with first and second helical segments 786, 788, it is contemplated that the heating sleeve 736 may include any number of helical segments 786, 788.

In a seventh exemplary embodiment as shown in a front view of FIG. 3N and a rear view of FIG. 3O, a heating member 824 may include a heating sleeve 836 with one or more grooves 880 with a plurality of helical segments 886, 888 extending in an opposite direction around the heating sleeve 836. For example, the heating sleeve 836 may include an upper annular segment 882 configured to receive process air from an upper gallery (e.g., 260) of a manifold body (e.g., 202). The process air may then be divided into a first flow path through the first helical segment 886 and a second flow path through the second helical segment 888. The first and second helical segments 886, 888 may intersect at segments 890 where the process air becomes turbulent. The process air from each of the first and second flow paths may pass into a lower annular segment 882 and, for example, in a lower gallery (e.g., 262, 264) of the manifold body. Although the heating member 824 is illustrated with first and second helical segments 886, 888, it is contemplated that the heating sleeve 836 may include any number of helical segments 886, 888.

The dispensing systems (e.g., FIGS. 1-2 and 4-6) of this disclosure may be used with one or more of the various embodiments of the heating sleeve. In that sense, each of the embodiments of the sleeve may be modified to fit any number of flow paths and/or applications. For example, the lower annular chamber (e.g. 382) may be added or omitted to the heating member depending on the presence of a lower gallery (e.g., 262, 264) in the manifold body. Although the various embodiments of the groove(s) of the heater sleeves are depicted to have a width substantially larger than a depth that may generate a thin film gap between an inner surface of the manifold body. It is also contemplated that the groove(s) may have a a depth substantially larger than a width, producing a thin film gap dictated by the width rather than the depth.

A controller (not shown) may be configured to regulate the heat provided by the various embodiments of the heating member to the process air and/or liquid material dispensed from the dispensing valve 116. For example, the controller may receive signals from the temperature sensor 146 and regulate the current provided to the heating cartridge by the electrical cable 140 in a closed loop system. The controller may also regulate the heating member 124 based on other dispensing variables, such as the dispenser design, operating modes, environmental conditions, the flow rate of the liquid material and/or thermal properties of the liquid material. The controller may be embodied by one or more software modules integrated into a computer system or non-transitory computer-readable media. The controller may also communicate with components (e.g., the heating member 124, the temperature sensor 146, and/or the electrical cable 140) through any number of wired or wireless connections.

Figure 5:
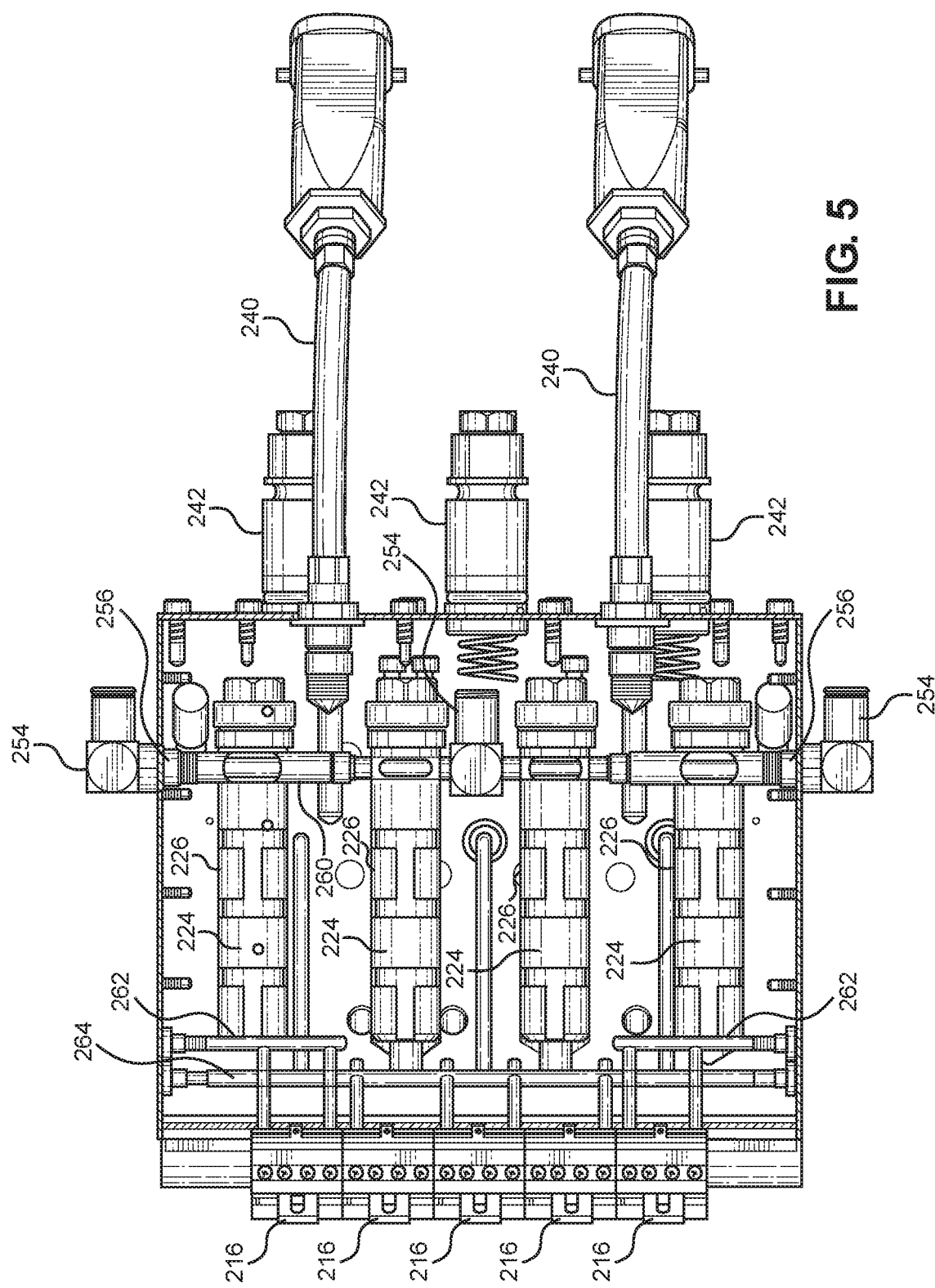
FIG. 5 illustrates an exemplary lateral cross-sectional view of the exemplary dispensing system of FIG. 4.

FIGS. 4-6 illustrates an exemplary dispensing system 200 including a manifold body 202 having a plurality of dispensing valves 216 and/or a plurality of heating members 224. The manifold body 202 may have a front surface 204, a rear surface 206, an upper surface 208, a lower surface 210, and oppositely disposed longitudinal surfaces 212, 214.

The dispensing valves 216 may be integrated and/or secured to the front of the manifold body 202. The dispensing valves 216 may include an on/off type nozzle having a valve stem (not shown) mounting for reciprocating movement in a chamber 220 along an axis to selectively dispense the liquid material (e.g., hot melt adhesive) in a specific pattern through a nozzle 222, such as in the form of one or more beads or filaments. The valve stem may be reciprocally driven by a drive mechanism 219 that may apply pressurized air to an upper portion of the valve stem. The drive mechanism 219 may force the valve stem into abutment with a valve seat at the bottom of chamber 220 to force the liquid material out of the nozzle 222 and onto a substrate. As further shown in FIGS. 4-6, the nozzle 222 may be integrated into the manifold body 202, and the drive mechanism 219 may be a separable component.

As further shown in FIGS. 5-6, the dispensing system 200 may include one or more heating members 224 received in one or more heating member housings 226 (FIG. 2) of the manifold body 202, and the heating members 224 may be configured to transmit heat to the liquid material and the process air, simultaneously. The heating members 224 may have a heating cartridge 134 and a heating sleeve 136 (e.g., as depicted FIGS. 3A-3D), and may be connected to one or more electrical cables 240 having one or more electric conduits. The electrical cables 240 may provide current from a power source (not shown) to the heating cartridge 134, and the heating cartridge may generate and transfer heat to the heating sleeve 136. The heating sleeve may transfer the heat to process air as the process air flows past the heating sleeve 136. The heating sleeve 136 may also transfer heat to the liquid material through contact with the manifold body 202. The heating sleeve may transmit heat to the manifold body 202 through contact along the length of the heating sleeve, for example, at an upper portion and a second (e.g., lower) portion. The manifold body 202 may be made of a heat-conductive material (e.g., aluminum) that transfers heat from the heating sleeve 136 to the liquid material as it passes through the liquid material passages. A close fit between the heating cartridge 134, the heating sleeve 136, and the heating member housing 226 may provide an expanded footprint of the heating cartridge and an improved uniformity and response of heating surfaces exposed to the process air and liquid material. The heating members 224 may also include a hexagonal head on a top surface for engaging a tool (not shown) to facilitate insertion and/or removal of the heating members 224 into/from the manifold body 202. As depicted in FIG. 5, the manifold body 202 may house a plurality of the heating members 224 to heat a plurality of parallel flows of liquid material and/or process air to be dispensed through one or more dispensing valves 216.

The dispensing system 200 may also include one or more filter assemblies 242 configured to filter out contaminants from the liquid material. As depicted in FIG. 6, the filter assemblies 242 may be received in a filter assembly housing 244 extending through the rear surface 206 of the manifold body 202 and at an angle substantially parallel to the heating member housing 226. The filter assemblies 242 may have an inlet, an outlet, and a passageway extending therebetween. The inlet of the filter assembly may be aligned with the vertical passage 238 to receive liquid material introduced into the manifold body 202 through one or more liquid material fittings 228. The filter assemblies 242 may include a unitary filter body having a fine mesh screen to filter or remove particles from the dispensing liquid flowing through the passageway of the filter. The filter assemblies 242 may also include a hexagonal head on a top surface for engaging a tool (not shown) to facilitate insertion and/or removal of the heating member 224 into/from the manifold body 202. The filter assemblies 242 may be spring-biased permitting ready removal, as further described in U.S. Pat. No. 7,264,717 entitled "Liquid Dispensing Apparatus and a Filter Assembly for a Liquid Dispensing Apparatus" and incorporated herein by reference in its entirety.

The dispensing system 200 may further include one or more temperature sensors (not shown) received in one or more temperature sensor housings (not shown) of the manifold body 202. The temperature sensors may be configured to detect heat generated by the heating member 224 and/or transmitted to the process air and/or liquid material. The temperature sensors and the temperature sensor housings may extend through the rear surface 206 and between the liquid material passage and the process air passage. In some embodiments, the temperature sensors and the temperature sensor housings may extend at an angle relative to the lateral axis of the manifold body 202 and substantially parallel to the heating member 224 and at least a portion of the liquid material passage. The temperature sensors may be electrically connected to the electrical cable 240.

The liquid material and pressurized process air may be supplied through the manifold body 202 to the dispensing valves 216 to thereby dispense beads or filaments of the liquid material onto a substrate. For example, the manifold body 202 may receive pressurized liquid material through the liquid material fitting 228 from a liquid material reservoir (not shown) via a liquid material pump (not shown). The liquid material fitting 228 may be recessed into a vertical passage 238 through the upper surface 208 of the manifold body 202, and the liquid material fitting 228 may be oriented in a number of different directions. The dispensing liquid may pass through the liquid material fitting 228 and the vertical passage 238, and into the filter assembly 242. The filter assembly 242 and the filter assembly housing 244 may be disposed at an acute angle relative to a lateral axis of the manifold body 202 and substantially parallel to the heating member 224 to provide a uniform heat distribution to the liquid material in the filter assembly 242. The filter assembly 242 may remove contaminants from the liquid material as the liquid material passes through the filter assembly housing 244. The liquid material may then pass through one or more passages 250, 252, where the liquid material is continuously heated. For example, the passages 250, 252 may include a vertical passage 250 and an angled passage 252 extending substantially parallel to the heating member 224, which increases the uniformity of the heat distribution of the liquid material. The liquid material may then enter into the chamber 220 of the dispensing valves 216 where the liquid material is dispensed through the nozzle 222.

As depicted FIGS. 4-6, the heating members 224 may provide process air passages 280 extending from one or more upper galleries 260 to one or more lower galleries 262, 264. For example, the manifold body 202 may receive pressurized air through one or more process air fittings 254 recessed in a passage 256 on one or more of the surfaces 210, 212, 214 of the manifold body 202. The upper galleries 260 may be in communication with a non-linear and/or tortuous passage disposed around the heating members 224, where the process air is heated. The process air may then pass through one or more lower galleries 262, 264, and through one or more process air passages 258. The process air passages 258 may include an annular passage extending around the nozzle 222 to distribute the process air continuously or at discrete points around the nozzle 222. For example, the annular passage may include a plurality of air discharge orifices 259 (FIG. 6) around the nozzle 222 that provide air pressure to modify the shape and/or direction of the dispensed liquid material.

As depicted in FIGS. 4-6, the manifold body 202 may include four heating members 224 and five dispensing valves 216. However, the manifold body 202 may include any number of heating members 224 and dispensing valves 216. The heating members 224 may collectively transmit heat to the manifold body 202 to heat the liquid material. The lower galleries 262, 264 may also be configured to collect the heated process air and provide even distribution of heated process air to each of the dispensing valves 216. As depicted in FIG. 5, one or more of the lower galleries 262 may be peripheral and not extend the width of the manifold body 202. This configuration may ensure that an even distribution of heated process air is provided to the dispensing valves 216 positioned on the periphery of the manifold body 202. However, in some embodiments, the lower galleries 262, 264 may be omitted, such that each dispensing valve 216 may receive process air from a single heating member 224 to provide independent control of the dispensing valves 216 and to ensure consistency and predictable temperature control.

A controller (not shown) may be configured to regulate the heat provided by the heating members 224 to the process air and/or liquid material dispensed from the dispensing valves 216. For example, the controller may receive signals from the temperature sensor and regulate the current provided to the heating cartridge 224 by the electrical cable 240 in a closed loop process. The controller may independently control each of the heating members 224 to ensure uniform heat distribution to the liquid material and/or the process air in the manifold body 202. The controller may also regulate the heating member 224 based on other dispensing variables, such as the dispenser design, operating modes, environmental conditions, the flow rate of the liquid material, and/or thermal properties of the liquid material. The controller may be embodied by one or more software modules integrated into a computer system or non-transitory computer-readable media. The controller may also communicate with components (e.g., the heating member 224, the temperature sensor, and/or the electrical cable 240) through any number of wired or wireless connections.

While illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed methods can be modified in any manner, including by reordering steps or inserting or deleting steps.

What is claimed is:

1. A dispensing system, comprising:
   a manifold body comprising a liquid material passage and a process air passage;
   a heating member received in the manifold body, the heating member having an upper portion, a lower portion, an outer surface, and a groove in the outer surface, the groove extending between the upper portion and the lower portion and forming at least a portion of the process air passage; and
   a nozzle configured to dispense liquid material,
   wherein the heating member is configured to heat process air as the process air passes through the groove, and the heating member is configured to heat the liquid material through contact of the outer surface of the heating member with the manifold body.

2. The dispensing system of claim 1, wherein the heating member comprises a heating cartridge and a heating sleeve disposed around the heating cartridge.

3. The dispensing system of claim 1, wherein the groove is non-linear.

4. The dispensing system of claim 1, wherein the groove comprises at least one annular segment and at least one longitudinal segment.

5. The dispensing system of claim 4, wherein the groove comprises a plurality of annular segments and a plurality of longitudinal segments, the annular segments and the longitudinal segments alternating along a longitudinal length of the heating member.

6. The dispensing system of claim 1, wherein the groove comprises a helical segment.

7. The dispensing system of claim 1, wherein the outer surface of the heating member has a surface area greater than a circumferential inner surface of the groove.

8. The dispensing system of claim 1, wherein the groove defines a first flow path and a second flow path, and the heating member is configured to divide the process air into the first and second flow paths.

9. The dispensing system of claim 1, wherein the heating member contacts the manifold body at the upper portion and the lower portion.

10. The dispensing system of claim 1, wherein the heating member is the only heating member received in the manifold body.

11. The dispensing system of claim 1, further comprising:
a second heating member received in the manifold body, the second heating member comprising a second outer surface that contacts the manifold body and a second groove in the outer surface that forms at least a second portion of the process air passage, the second heating member positioned substantially parallel to the heating member,
wherein the manifold body comprises an upper gallery configured to receive the process air and distribute the process air to the groove and the second groove.

12. The dispensing system of claim 11, wherein the groove and the second groove comprise an upper annular segment in communication with the upper gallery and configured to receive the process air from the upper gallery.

13. The dispensing system of claim 11, further comprising:
a second nozzle configured to dispense the liquid material,
wherein the manifold body comprises a lower gallery configured to receive the process air from the groove and the second groove and distribute the process air to the nozzle and the second nozzle.

14. The dispensing system of claim 1, further comprising:
a filter disposed in the liquid material passage and configured to remove contaminants from the liquid material; and
a temperature sensor disposed in the manifold body and configured to detect the heat generated by the heating member.

15. A method of dispensing a liquid material comprising:
receiving the liquid material in a liquid material passage of a manifold body;
receiving process air in a process air passage of the manifold body;
heating the liquid material through contact of an outer surface of a heating member with the manifold body;
heating the process air by receiving the process air in a groove of the heating member, the groove extending from an upper portion of the heating member to a lower portion of the heating member and forming at least a portion of the process air passage; and
dispensing the liquid material with a nozzle.

16. The method of claim 15, further comprising:
passing the process air through at least one annular segment of the groove; and
passing the process air through at least one longitudinal segment of the groove.

17. The method of claim 15, further comprising passing the process air through a helical segment of the groove.

18. The method of claim 15, wherein heating the liquid material is through contact between the upper and lower portions of heating member and the manifold body.

19. A dispensing system, comprising:
a manifold body comprising a liquid material passage and a process air passage;
a filter disposed in the liquid material passage and configured to remove contaminants from liquid material;
a heating member received in the manifold body, the heating member having a heating cartridge and a heating sleeve disposed around the heating cartridge, the heating member having an upper portion, a lower portion, an outer surface formed by the heating sleeve, and a groove in the outer surface, the groove extending between the upper portion and the lower portion and forming at least a portion of the process air passage, the groove comprising a plurality of annular segments and a plurality of longitudinal segments that alternate along a longitudinal length of the heating member;
a temperature sensor disposed in the manifold body and configured to detect heat generated by the heating member; and
a nozzle configured to dispense liquid material,
wherein the heating member is configured to heat the process air as the process air passes through the groove, and the heating member is configured to heat the liquid material through contact of the outer surface of the heating member with the manifold body.

20. The dispensing system of claim 19, wherein the heating member contacts the manifold body at the upper portion and the lower portion.

* * * * *